United States Patent
Cockenpot et al.

(10) Patent No.: US 11,945,570 B2
(45) Date of Patent: Apr. 2, 2024

(54) DEVICE FOR PILOTING AN AIRCRAFT AND ASSOCIATED METHOD

(71) Applicant: DASSAULT AVIATION, Paris (FR)

(72) Inventors: Fabien Cockenpot, Saint Cloud (FR); François Pineau, Saint Cloud (FR); Jérôme Le Borloch, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 17/550,006

(22) Filed: Dec. 14, 2021

(65) Prior Publication Data
US 2022/0185455 A1 Jun. 16, 2022

(30) Foreign Application Priority Data

Dec. 15, 2020 (FR) ...................................... 20 13258

(51) Int. Cl.
*B64C 13/04* (2006.01)
*B64C 13/06* (2006.01)
*B64C 13/12* (2006.01)

(52) U.S. Cl.
CPC .......... *B64C 13/0421* (2018.01); *B64C 13/06* (2013.01); *B64C 13/12* (2013.01)

(58) Field of Classification Search
CPC ..... B64C 13/06; B64C 13/12; B64C 13/0421; G05G 11/00
See application file for complete search history.

(56) References Cited

U.S. PATENT DOCUMENTS

| | | | |
|---|---|---|---|
| 4,688,443 A | 8/1987 | Fabre et al. | |
| 5,291,113 A * | 3/1994 | Hegg | G05G 11/00 244/234 |
| 5,582,363 A * | 12/1996 | Davis | E05B 67/383 70/183 |
| 6,000,662 A * | 12/1999 | Todeschi | B64C 13/0421 244/223 |

(Continued)

FOREIGN PATENT DOCUMENTS

| | | |
|---|---|---|
| EP | 0204598 A1 | 12/1986 |
| FR | 2888009 A1 | 1/2007 |

(Continued)

OTHER PUBLICATIONS

Search Report for priority application FR 2013258.

*Primary Examiner* — Tien Q Dinh
*Assistant Examiner* — Katherine June Bolek
(74) *Attorney, Agent, or Firm* — Davidson, Davidson & Kappel, LLC

(57) ABSTRACT

A piloting device for piloting an aircraft comprises a first and a second control stick mounted movable on a support. The device comprises a priority selection module configured to switch the first and second control sticks between a piloting configuration and a non-piloting configuration. The device further comprises a detection system for detecting the positions of the first and second control sticks; a first and second actuation system configured to generate respective first and second forces on the respective first and second control stick; and a control module configured to control the actuation system of the control stick which is in a non-piloting configuration such that the positions of the control sticks are identical.

16 Claims, 7 Drawing Sheets

(56) References Cited

U.S. PATENT DOCUMENTS

| | | | |
|---|---|---|---|
| 8,659,257 B2* | 2/2014 | Antraygue | G05D 1/0077 |
| | | | 318/632 |
| 10,589,844 B2* | 3/2020 | Ott | B64C 13/507 |
| 2009/0314901 A1 | 12/2009 | Granier et al. | |
| 2012/0025029 A1 | 2/2012 | Szulyk et al. | |

FOREIGN PATENT DOCUMENTS

| | | | | |
|---|---|---|---|---|
| FR | 2963318 A1 | | 2/2012 | |
| WO | WO-2014199212 A1 | * | 12/2014 | B64C 13/0421 |

\* cited by examiner

DEVICE FOR PILOTING AN AIRCRAFT AND ASSOCIATED METHOD

The present disclosure relates to a piloting device for piloting an aircraft of the type comprising a first control stick and a second control stick, each mounted on a support, each control stick being movable in relation to the support between a plurality of positions around a neutral position in at least one degree of freedom, each control stick being configurable between a piloting configuration, in which said control stick is capable of piloting the aircraft by sending a trajectory command to a control unit, and a non-piloting configuration, in which no trajectory command from said control stick is taken into account by the control unit, the piloting device further comprising a priority selection module configured to switch the first control stick between the piloting configuration and the non-piloting configuration, the selection module being configured to switch the second control stick to the non-piloting configuration when the first control stick is in the piloting configuration and to the piloting configuration when the first control stick is in the non-piloting configuration.

BACKGROUND

Such a piloting device is intended to facilitate the piloting of the aircraft by making it possible for a first pilot, in control of the first control stick, and/or a second pilot, in control of the second control stick, to control the aircraft. In such a piloting device, the two control sticks make it possible for the first and second pilot to send trajectory commands to a flight control unit simultaneously, for example. The flight control unit then performs a sum of the trajectory commands it receives. This sum can be a simple sum of the commands, or a sum weighted according to a prioritization of the trajectory commands sent by the first or second pilot, depending on who is the pilot in charge of flying the aircraft.

SUMMARY

However, with such a piloting device, the first pilot, such as the pilot in charge of flying the aircraft, does not receive direct information on the trajectory commands sent by the second pilot, and vice versa. The second pilot can only estimate said trajectory commands by visualizing the aircraft's on-board instruments, for example.

Thus, such a piloting device does not offer the second pilot an accurate overview of the trajectory commands sent by the first pilot, and vice versa. The second pilot can therefore only react to the trajectory commands after a certain reaction time, representing the time needed for him/her to estimate said trajectory commands. This can be difficult, especially when the second pilot becomes the pilot in charge of flying the aircraft, replacing the first pilot.

An aim of the present disclosure is to overcome these drawbacks by proposing a piloting device that makes precise and efficient cooperation possible between two pilots of the same aircraft.

To this end, the present disclosure provides a piloting device of the above-mentioned type, further comprising:

a detection system for detecting the position of the first control stick and the position of the second control stick;

first actuation system configured to generate a first force on the first control stick according to the degree of freedom;

a second actuation system configured to generate a second force on the second control stick according to the degree of freedom; and a control module configured to control the actuation system of the control stick which is in the non-piloting configuration, such that the position of said control stick in the non-piloting configuration and the position of the control stick which is in the piloting configuration are identical.

The device according to the present disclosure may comprise one or more of the following features, taken alone or in any technically feasible combination:

the piloting device comprises at least one control system for controlling the selection module, the control system being configured to be operated by a pilot to control the selection module, so as to switch the first control stick between the piloting configuration and the non-piloting configuration;

the control system comprises a shared control element, located on a control panel of a cockpit of the aircraft;

the shared control element is a shared button, the selection module being configured to change the configuration of the first control stick from either its piloting or its non-piloting configuration to the other when the shared button is selected by a pilot;

the control system further comprises at least two individual control elements, each control stick comprising an individual control element;

each individual control element is an individual button, the selection module being configured to switch the first control stick to its piloting configuration when the individual button of the first control stick is selected by a pilot;

the selection module is configured to switch the first control stick to its piloting configuration when the individual button of the first control stick is held down by a pilot, the selection module being further configured to switch the first control stick to its non-piloting configuration when the individual button of the first control stick is released;

when the individual button of the first control stick is held down by a pilot for a duration greater than a duration threshold, the selection module keeps the first control stick in its piloting configuration;

the piloting device comprises a priority indication system configured to output a signal representative of the configuration of at least one control stick among of the first control stick and the second control stick;

the indication system comprises at least one indicator light, the signal being a light signal visible to the pilot, indicating the current configuration of at least one of the first control stick and the second control stick; and the indication system further comprises a vibrator, the signal being a vibration perceptible by a pilot, indicating that the configuration of each control stick has been changed.

The present disclosure also provides a piloting method for piloting an aircraft using a piloting device as described above, the method comprising the steps of:

configuration of the first control stick in the piloting configuration and of the second control stick in the non-piloting configuration, by the selection module, moving of the first control stick according to the degree of freedom, by a pilot ; and controlling of the second actuation system by the control module, to generate a second force on the second control stick according to the degree of freedom so that the position of the second control stick and the position of the first control stick are identical.

The method according to the present disclosure may also comprise one or more of the following features, taken alone or in any technically feasible combination:

the piloting device comprises at least one control system for controlling the selection module, the control system being configured to be operated by a pilot to control the selection module, so as to switch the first control stick between the piloting configuration and the non-piloting configuration, the method comprising a prior step of actuating the control system to switch the first control stick to the piloting configuration and the second control stick to the non-piloting configuration, said prior step being carried out by a pilot;

the control system comprises a shared control element, the shared control element being a shared button, the selection module switching the first control stick from either its piloting configuration or its non-piloting configuration to the other when the shared button is selected by a pilot;

the control system comprises at least two individual control elements, each control stick comprising an individual control element, each individual control element being an individual button, the selection module switching the first control stick to its piloting configuration when the individual button of the first control stick is held down by a pilot, the selection module switching the first control stick to its non-piloting configuration when the individual button of the first control stick is released; and the control system comprises at least two individual control elements, each control stick comprising an individual control element, each individual control element being an individual button, the selection module switching the first control stick to its piloting configuration when the individual button of the first control stick is held down by a pilot for a duration greater than a duration threshold.

BRIEF SUMMARY OF THE DRAWINGS

The present disclosure will be better understood upon reading the following description, given only as an example and made with reference to the appended drawings, in which.

DETAILED DESCRIPTION

Figure 1:
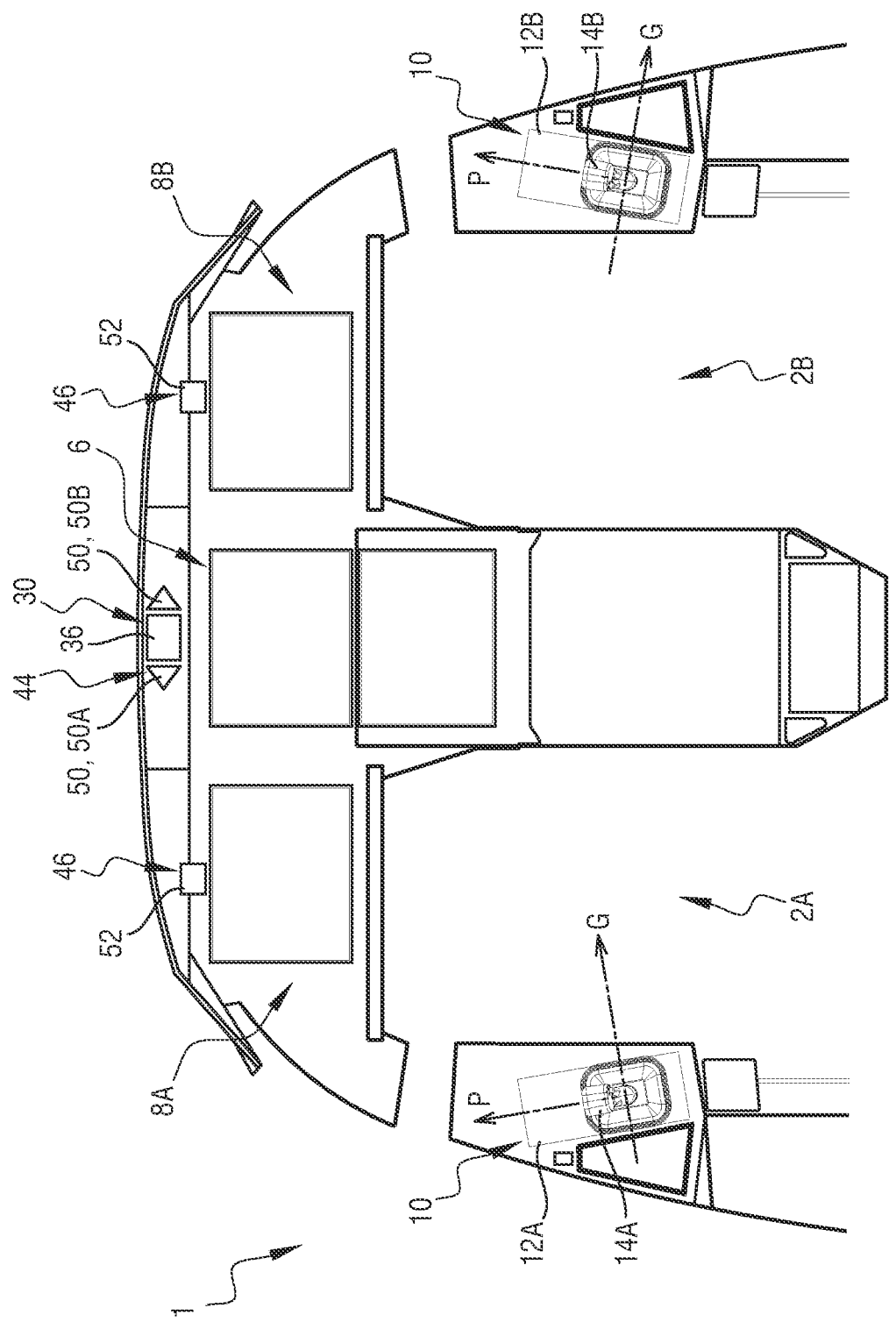
FIG. 1 is a schematic plan view of an aircraft cockpit in which a piloting device according to the present disclosure is implemented.

With reference to FIG. 1, an aircraft cockpit 1 is described. The cockpit 1 comprises a first cockpit area 2A and a second cockpit area 2B.

The first cockpit area 2A is intended to accommodate a first aircraft pilot, such as the captain. The second cockpit area 2B is intended to accommodate a second aircraft pilot, such as the co-pilot.

The cockpit 1 comprises a control panel 6. The control panel 6 comprises elements accessible and operable by the pilots, to fly the aircraft. These elements are conventional and will not be described in detail here.

The cockpit 1 further comprises at least two display panels 8. Each display panel is configured to display flight information to a pilot. A first display panel 8A is located in the first cockpit area 2A and is configured to display flight information to the first pilot. A second display panel 8B is located in the second cockpit area 2B and is configured to display flight information to the second pilot.

In the following, with reference to FIGS. 1 to 7, an aircraft piloting device 10 is described. Such a piloting device 10 is intended to be installed in the cockpit 1 of the aircraft as illustrated in FIG. 1.

The piloting device 10 is intended to make it possible for the first pilot and/or second pilot to pilot the aircraft by operating movable aircraft surfaces, to generate roll and pitch control.

The piloting device 10 comprises a first support 12A located in the first cockpit area 2A and a second support 12B located in the second cockpit area 2B.

The piloting device 10 further comprises a first control stick 14A mounted on the first support 12A and a second control stick 14B mounted on the second support 12B.

Figure 3:
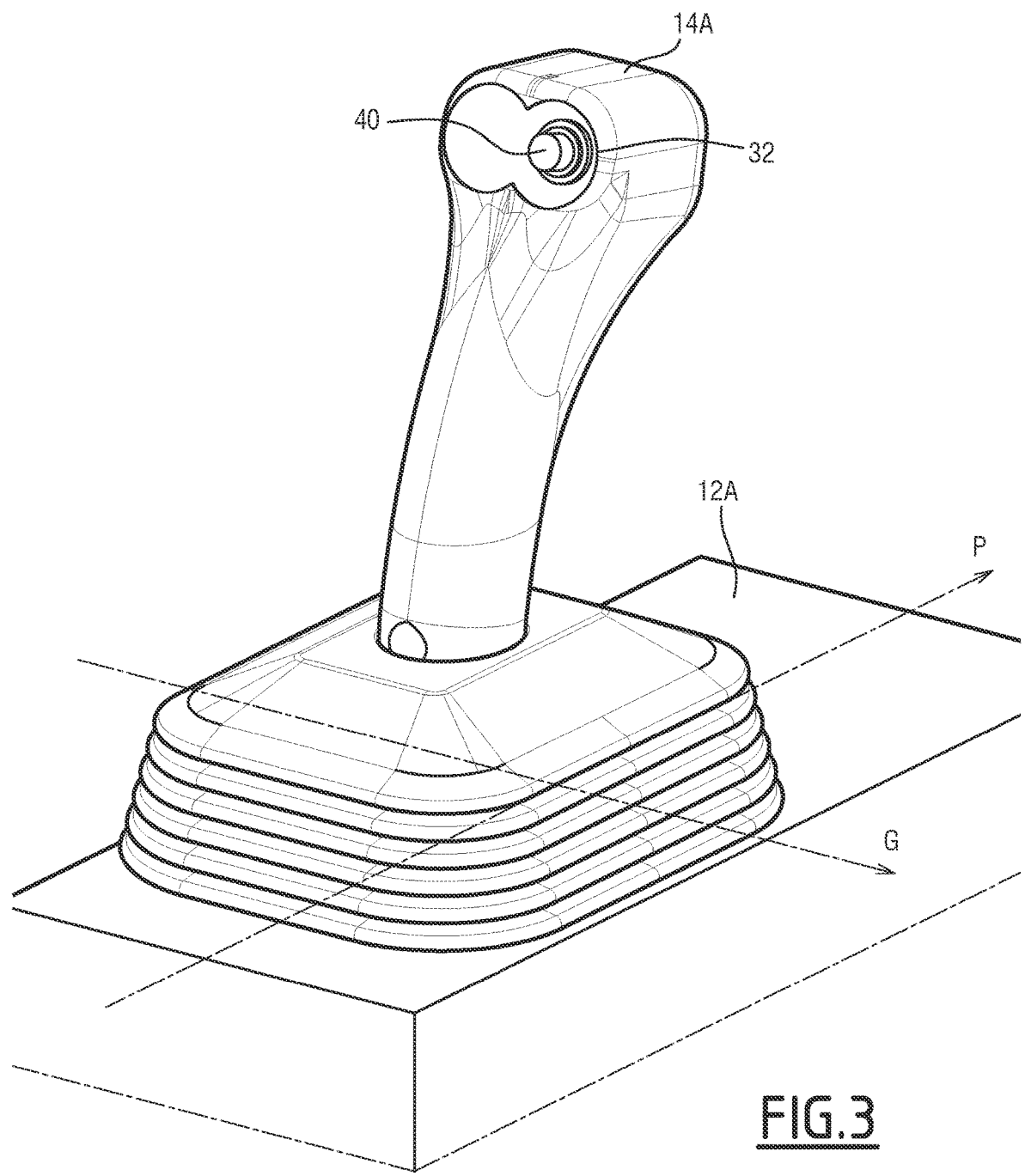
FIG. 3 is a three-quarter perspective view of a part of the piloting device according to the present disclosure, comprising a control stick and a support on which said control stick is mounted, the control stick comprising an individual control element.

FIG. 3 illustrates an example of a control stick 14A, 14B mounted on a support 12A, 12B. In particular, FIG. 3 illustrates a control stick 14A mounted on a support 12A.

Each stick 14A, 14B is mounted movable on the corresponding support 12A, 12B between a plurality of positions around a neutral position in at least one degree of freedom.

In the following, an embodiment of the piloting device 10 to control aircraft controlled members is described.

The controlled members are aircraft control surfaces, for example, with control carried out by means of servo-controls. The control surfaces are aircraft ailerons for roll control and an aircraft elevator for pitch control, for example. These control surfaces form movable control surfaces.

The number of degrees of freedom is two, for example. Each degree of freedom has a neutral position. The first degree of freedom is defined along a longitudinal direction P corresponding to pitch, for example. The second degree of freedom is defined along a transverse direction G perpendicular to the longitudinal direction, corresponding to roll, for example.

The first degree of freedom corresponds to control over an aircraft pitch axis, for example. Movement of the stick 14A, 14B to the front of the aircraft corresponds to a command to dive the nose of the aircraft, for example. Movement of the stick 14A, 14B to the rear corresponds to a command to straighten the nose of the aircraft, for example.

The second degree of freedom corresponds to control over an aircraft roll axis, for example. Movement of the stick 14A, 14B to the right of the aircraft corresponds to a command to tilt the aircraft to the right, for example. Movement of the stick 14A, 14B to the left corresponds to a command to tilt the aircraft to the left, for example.

The aircraft is thus controlled by a pilot moving the stick 14A, 14B according to at least one degree of freedom.

In the following, it is considered that the first control stick 14A is intended to be controlled by the first pilot, and the second stick 14B is intended to be controlled by the second pilot.

Each stick 14A, 14B is configurable between a piloting configuration and a non-piloting configuration.

Figure 2:
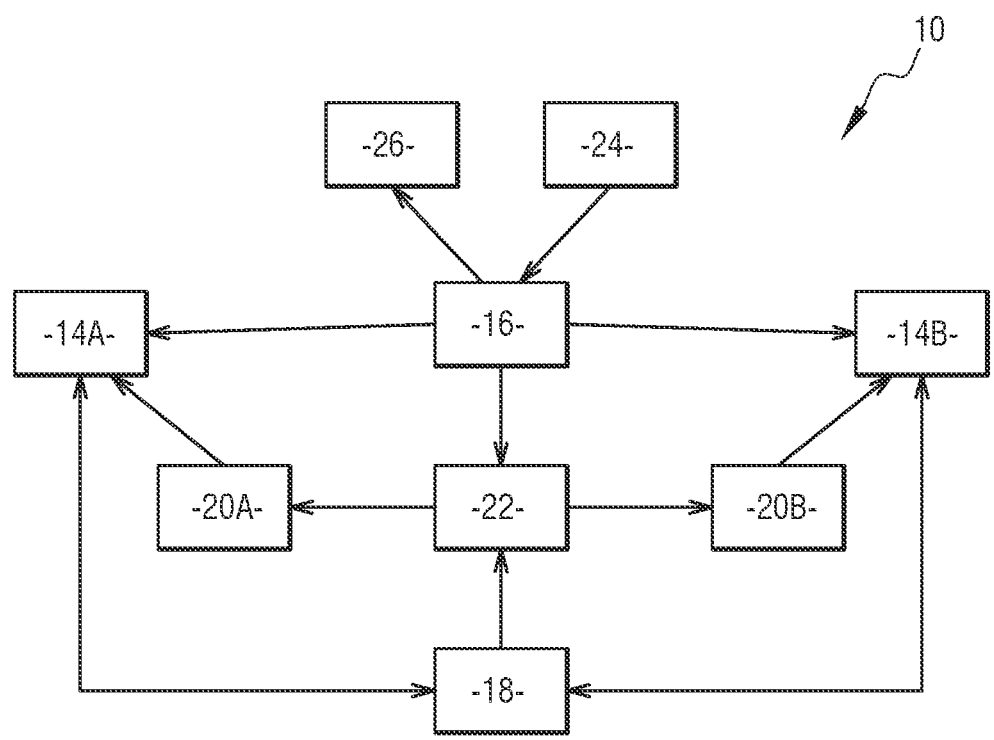
FIG. 2 is a schematic representation of the piloting device according to the present disclosure.

With reference to FIG. 2, the piloting device 10 further comprises a priority selection module 16 configured to switch each stick 14A, 14B between the piloting configuration and the non-piloting configuration and a detection system 18 for detecting the position of the first control stick 14A and the position of the second control stick 14B.

The piloting device 10 further comprises a control system 24 for a pilot to control the selection module 16 and a priority indication system 26.

The piloting device 10 further comprises a first actuation system 20A for moving the first control stick 14A, a second actuation system 20B for moving the second control stick 14B and a control module 22 for controlling the first and second actuation systems 20A, 20B.

In the piloting configuration of one of the control sticks 14A, 14B, the other control stick 14B, 14A being in a non-piloting configuration, the control stick 14A, 14B in the piloting configuration is capable of piloting the aircraft by sending a trajectory command to an aircraft control unit. In the non-piloting configuration of one of the sticks 14A, 14B, with the other stick 14B, 14A being in a piloting configuration, no trajectory command coming from said stick 14A, 14B in the non-piloting configuration is taken into account by the control unit.

When the first control stick 14A, respectively the second control stick 14B, is in a piloting configuration, the first pilot, respectively the second pilot, is called the "pilot flying". He/she pilots the aircraft by means of the first stick 14A or the second stick 14B, respectively.

When the first control stick 14A, respectively the second control stick 14B, is in a non-piloting configuration, the first pilot, respectively the second pilot, is called "pilot monitoring". No trajectory command coming from the first control stick 14A, respectively the second control stick 14B, is taken into account by the control unit.

The selection module 16 is connected to each of the first and second control sticks 14A, 14B.

The selection module 16 is configured to switch the first control stick 14A between the piloting and the non-piloting configuration based in particular on a command received from a pilot via the control system 24. The selection module 16 is further configured to switch the second control stick 14B to the non-piloting configuration when the first control stick 14A is in the piloting configuration, and to the piloting configuration when the first control stick 14A is in the non-piloting configuration.

Symmetrically, the selection module 16 is configured to switch the second control stick 14B between the piloting and the non-piloting configuration. The selection module 16 is further configured to switch the first control stick 14A in the non-piloting configuration when the second control stick 14B is in the piloting configuration, and in the piloting configuration when the second control stick 14B is in the non-piloting configuration.

In this way, only one pilot, either the first or the second pilot, flies the aircraft exclusively through the control stick 14A, 14B associated to him/her. In other words, only the first or second pilot flies the aircraft through his/her respective stick 14A or 14B.

The selection module 16 is further configured to generate selection data representative of the stick 14A, 14B in a piloting configuration. The selection data indicates the identity of the control stick 14A, 14B which is in the piloting configuration.

The selection module 16 comprises a software module, for example, within at least one computer with a memory suitable for receiving the module and a processor suitable for executing the software module stored in said memory.

The detection system 18 is connected to each control stick 14A, 14B. It is configured to generate first position data representative of the position of the first control stick 14A, and second position data representative of the position of the second control stick 14B.

First position data represent the position of the first control stick 14A according to each degree of freedom. Second position data represent the position of the second control stick 14B according to each degree of freedom.

The detection system 18 comprises a first position sensor, configured to generate said first position data, and a second position sensor, configured to generate said second position data.

Position data relative to the position of the stick which is in the piloting configuration is sent to the aircraft control unit, for example. The movable aircraft surfaces are controlled based on these position data.

The first actuation system 20A is configured to move the first control stick 14A according to each degree of freedom. In particular, the first actuation system 20A is configured to generate a first force on the first control stick 14A according to each degree of freedom. The first actuation system 20A comprises one actuator for each degree of freedom. Each actuator of the first actuation system 20A is configured to move the first control stick 14A according to the associated degree of freedom. To do so, each actuator of the first actuation system 20A applies a first force to the first control stick 14A according to the associated degree of freedom. This modifies the force/movement rule.

The second actuation system 20B is configured to move the second control stick 14B according to each degree of freedom. In particular, the second actuation system 20B is configured to generate a second force on the second control stick 14B according to each degree of freedom. The second actuation system 20B comprises one actuator (not illustrated) for each degree of freedom. Each actuator of the second actuation system 20B is configured to move the second control stick 14B according to the associated degree of freedom. To do so, each actuator of the second actuation system 20B applies a second force to the second control stick 14B according to the associated degree of freedom. This modifies the force/movement rule.

The control module 22 is connected to the selection module 16, the detection system 18, and the first and second actuation systems 20A, 20B. The control module 22 receives selection data from the selection module 16 and first position data and second position data from the detection system 18.

From selection data, the control module 22 is configured to deduce which control stick 14A, 14B is in a piloting configuration and which control stick 14A, 14B is in a non-piloting configuration.

From the first position data and the second position data, the control module 22 is configured to deduce the position of the first control stick 14A and the second control stick 14B according to each degree of freedom.

The control module 22 is further configured to control the actuation system 20A, 20B of the control stick 14A, 14B which is in the non-piloting configuration such that the position of said control stick 14A, 14B in the non-piloting configuration and the position of the control stick 14A, 14B in the piloting configuration are identical, according to each degree of freedom. For example, when the first control stick 14A is in the piloting position, then the second control stick 14B is in the non-piloting position. The control module 22 then controls the second actuation system 20B so that the position of the second control stick 14B and the position of the first control stick 14A are identical, according to each degree of freedom. According to another example, the first control stick 14A is in the non-piloting configuration when the second control stick 14B is in the piloting configuration. The control module 22 then controls the first actuation system 20A so that the position of the first control stick 14A and the position of the second control stick 14B are identical, according to each degree of freedom.

The control module 22 is a software module, suitable for execution by a computer processor of the piloting device 10, for example.

The control system 24 is connected to the selection module 16 and is configured to be operated by a pilot to control the selection module 16 so as to control the first control stick 14A or the second control stick 14B between the piloting configuration and the non-piloting configuration, for example.

The control system 24 comprises at least one shared control element 30 (visible in FIGS. 1, 4 and 5) and at least two individual control elements 32 (one individual control element 32 is visible in FIG. 3), for example.

As illustrated in FIG. 1, the shared control element 30 is located on the control panel 6 of the aircraft cockpit 1, for example. The shared control element 30 is a shared button 36, for example. The button 36 is a physical button and/or a software button displayed on a screen of the piloting device 10, for example.

The selection module 16 is configured to change the configuration of the first control stick 14A from its piloting or non-piloting configuration to the other when the shared button 36 is selected by a pilot, for example. The selection module 16 is configured to change the configuration of the first control stick 14A, for example, whenever the shared button 36 is pressed by a pilot.

Each control stick 14A, 14B comprises an individual control element 32, for example.

As illustrated in FIG. 3, the individual control element 32 is an individual button 40 supported by the control stick 14A, 14B, for example.

The selection module 16 is configured to switch the first control stick 14A to its piloting configuration when the individual button 40 on the first control stick 14A is selected by the first pilot, in control of the first control stick 14A, for example.

After the first stick 14A has been switched to its piloting configuration, when the individual button 40 of the first control stick 14A is held down by the first pilot for longer than a duration threshold, the selection module 16 keeps the first stick 14A in its piloting configuration, even if the individual button 40 is released. The duration threshold is greater than 1 second, for example, in particular greater than 5 seconds.

In contrast, if the individual button 40 is held down for a duration less than the duration threshold, the selection module 16 does not switch the first control stick 14A into its piloting configuration, or keeps the first control stick 14A in the piloting configuration only as long as the individual button 40 is held down. The latter case make it possible to make a brief correction in trajectory, for example.

Similarly, the selection module 16 is configured to switch the second control stick 14B to its piloting configuration when the individual button 40 of the second control stick 14B is selected by the second pilot, in control of the second control stick 14B.

After the second control stick 14B has been switched to its piloting configuration, when the individual button 40 of the second control stick 14B is held down by the second pilot for longer than a duration threshold, the selection module 16 keeps the second control stick 14B in its piloting configuration, even if the individual button 40 is released. The duration threshold is greater than 1 second, for example, in particular greater than 5 seconds.

In contrast, if the individual button 40 is held down for less than the duration threshold, the selection module 16 does not switch the second control stick 14B to its piloting configuration, or keeps the second control stick 14B in the piloting configuration only as long as the individual button 40 is held down. The latter case make it possible to make a brief correction in trajectory, for example.

To avoid conflicts in separate control element actuations, for example, the selection module 16 is further configured to take the most recent actuation into account, chronologically.

Thus, if multiple elements are actuated, between the shared control element 30 and the individual control elements 32, the selection module 16 only considers the actuation of the element that was actuated last, chronologically.

The indication system 26 is connected to the selection module 16. It is configured to output a signal representative of the configuration of at least one of the first control stick 14A or second control stick 14B. The signal indicates the current configuration of at least one control stick 14A, 14B, for example, or that the current configuration of the control sticks 14A, 14B has been changed.

The indication system 26 comprises a shared illuminated indicator element 44, two individual illuminated indicator elements 46, two individual haptic indicator elements, and a controller 48 (illustrated in FIGS. 4-7) for controlling the elements 44, 46, for example.

As illustrated in FIG. 1, the shared illuminated indicator element 44 is visible on the control panel 6 of the aircraft cockpit 1, for example. The shared illuminated indicator element 44 is located such that it is visible to the first and second pilots.

The shared illuminated indicator element 44 comprises at least one shared indicator light 50, for example. The signal is then a light signal emitted by the shared indicator light 50 and visible to a pilot. The light signal indicates the current configuration of at least one control stick 14A, 14B of the first control stick 14A and the second control stick 14B, for example.

Figure 4:
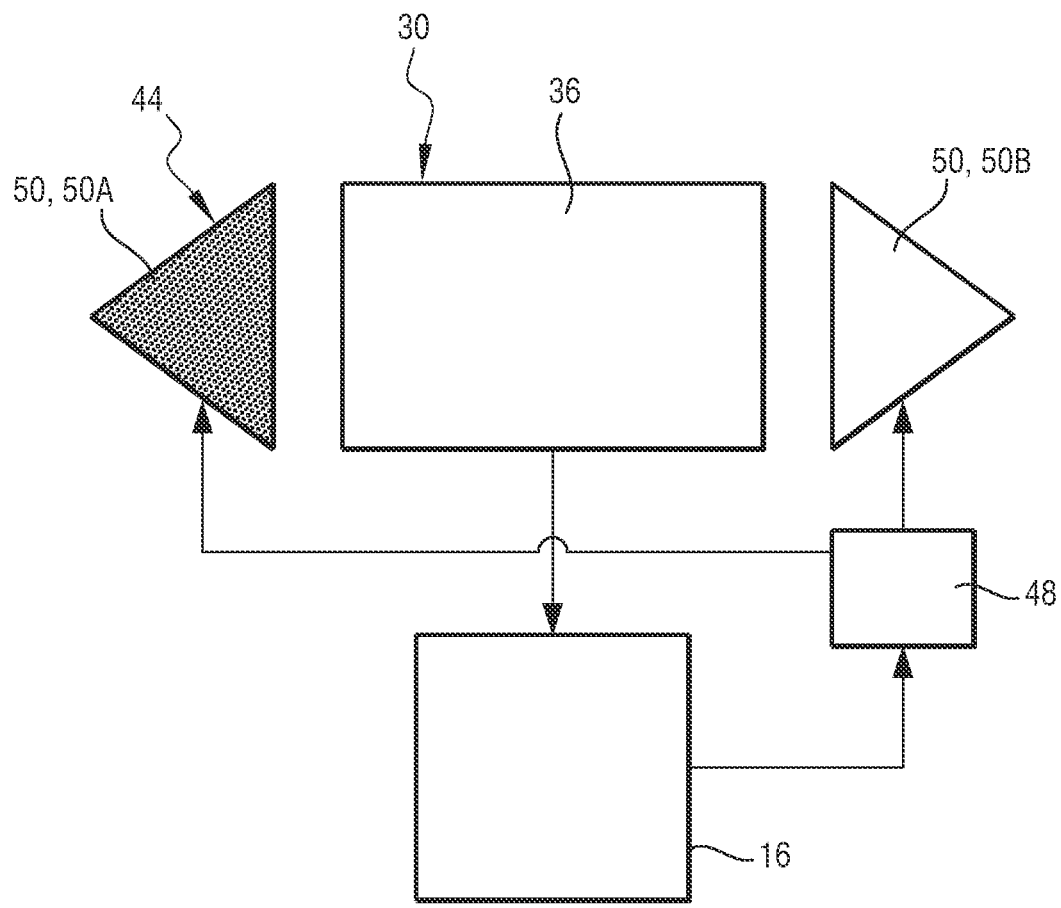
FIG. 4 is a schematic representation of a part of the piloting device, comprising a priority selection module, a shared control element for controlling the priority selection module and a shared illuminated indicator element, the shared illuminated indicator element emitting a light signal indicating that the first control stick is in a piloting configuration and the second control stick is in a non-piloting configuration.
Figure 5:
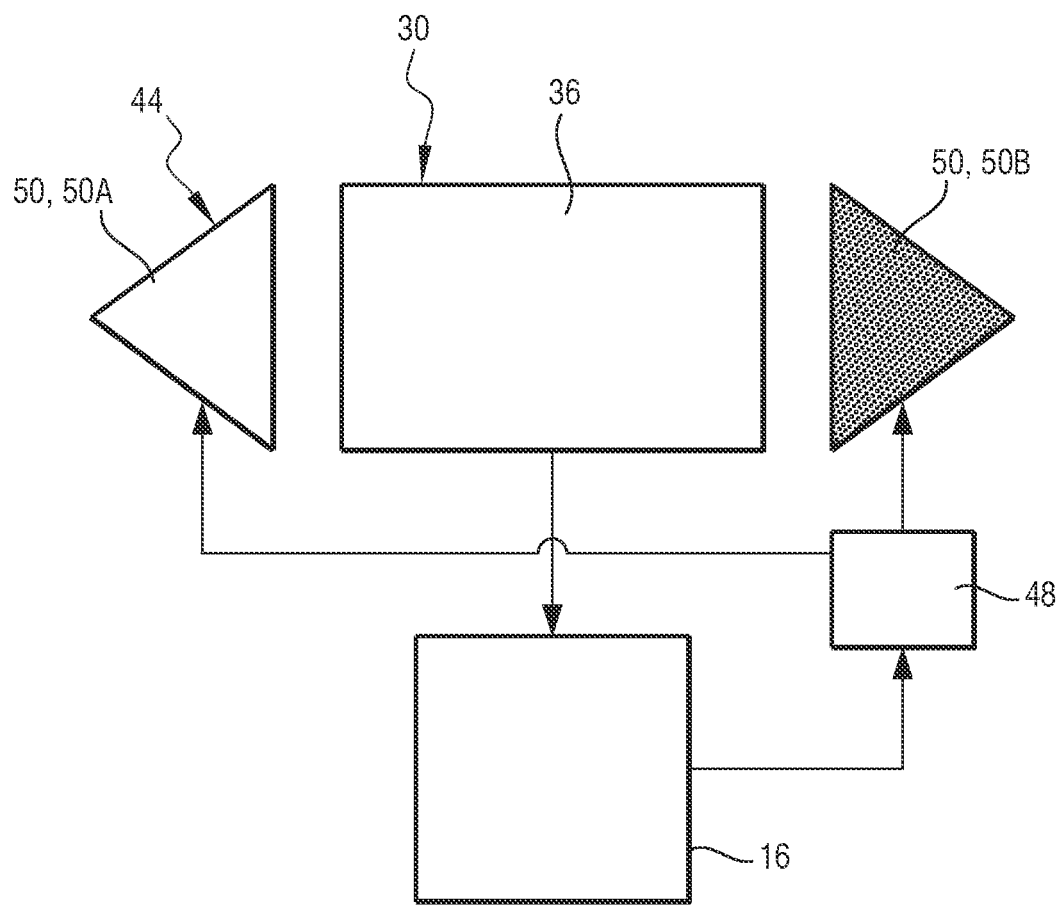
FIG. 5 is a schematic representation similar to that of FIG. 4, except that the shared illuminated indicator element emits a light signal indicating that the first control stick is in a non-piloting configuration and the second control stick is in a piloting configuration.

As illustrated in FIGS. 1, 3, and 4, the shared illuminated indicator element 44 comprises two shared indicator lights 50 located on opposite sides of the shared button 36, for example. A first shared indicator light 50A is located on the side of the first control stick 14A, i.e., on the side of the first cockpit area 2A, and a second shared indicator light 50B is located on the side of the second control stick 14B, i.e., on the side of the second cockpit area 2B.

As illustrated in FIG. 1, the individual illuminated indicator elements 46 are each visible on a display panel 8, for example, in particular on a screen of the display panel 8. Each individual illuminated indicator element 46 is located so that it is visible to at least the pilot positioned in the associated cockpit area 2A, 2B.

Figure 6:
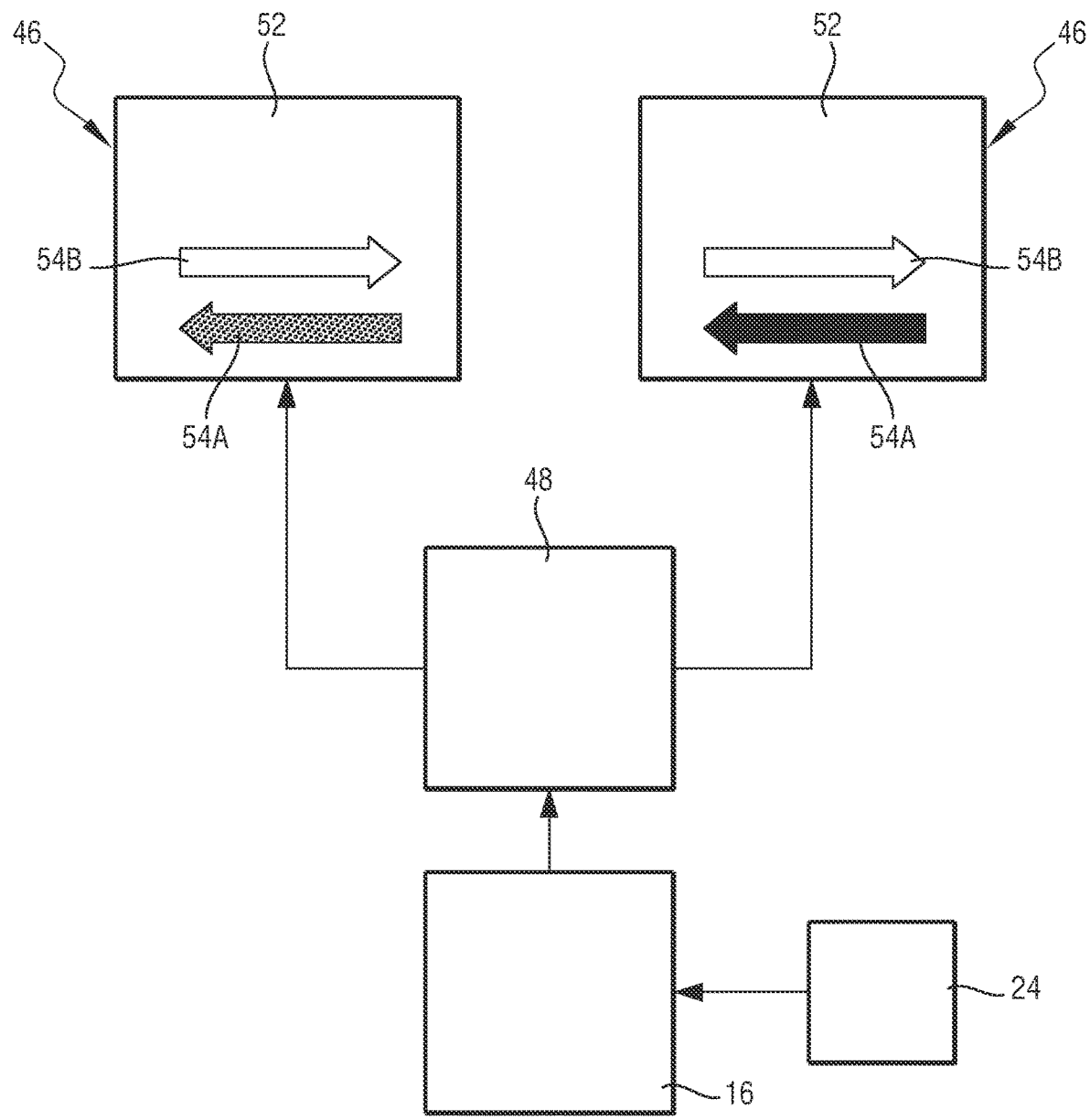
FIG. 6 is a schematic representation of a part of the piloting device, comprising a priority selection module, a control system for controlling the priority selection module, and two individual illuminated indicator elements, each individual illuminated indicator elements emitting a light signal indicating that the first control stick is in a piloting configuration and the second control stick is in a non-piloting configuration; and IG. 7 is a schematic representation similar to FIG. 6, except that each individual illuminated indicator element emits a light signal, indicating that the first control stick is in a non-piloting configuration and the second control stick is in a piloting configuration.
Figure 7:
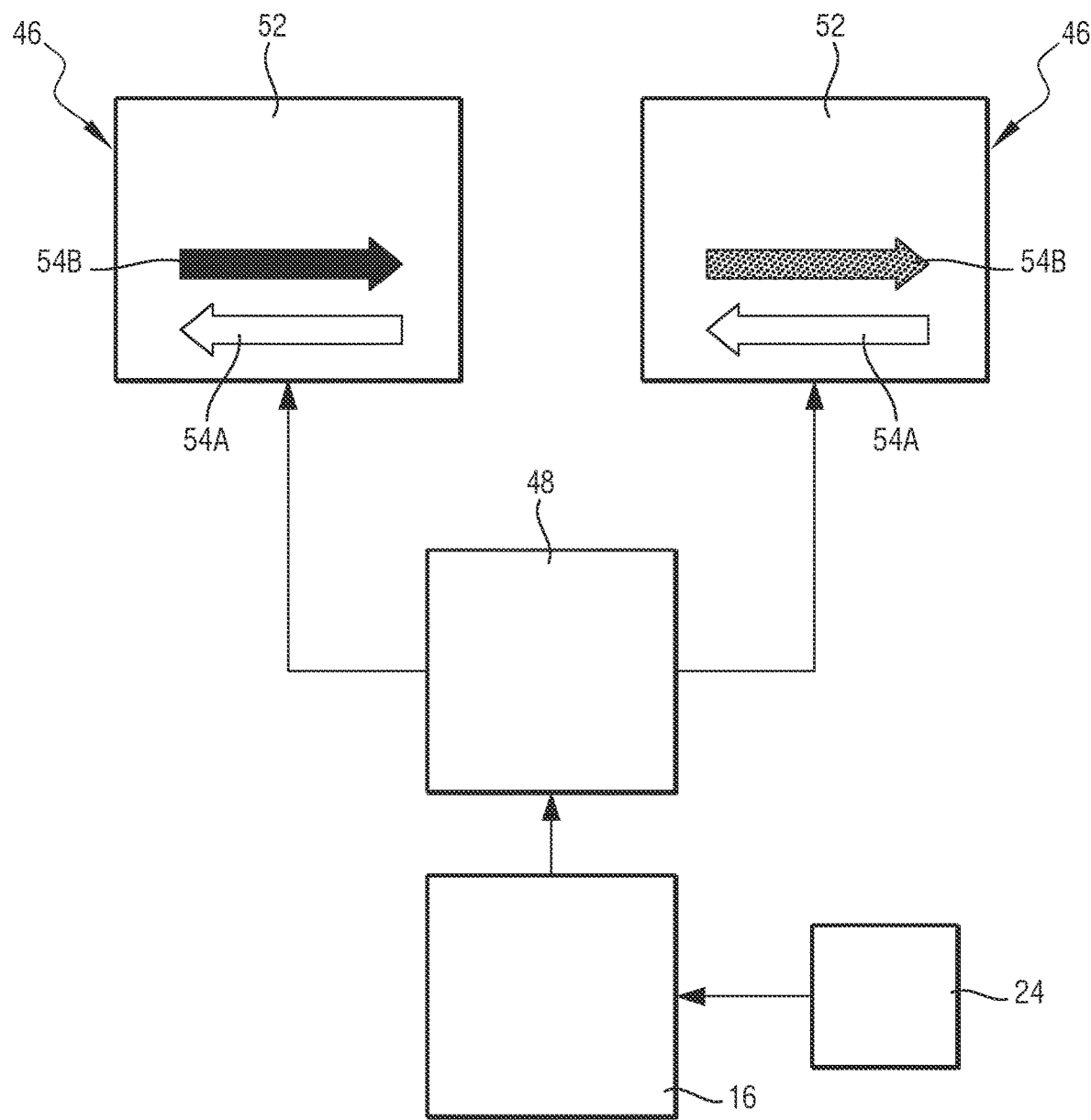

With reference to FIGS. 1, 6 and 7, the individual illuminated indicator element 46 comprises at least one individual indicator light 52, for example. The signal is then a light signal emitted by the individual indicator light 52 and visible to the pilot. The light signal indicates the current configuration of each control stick 14A, 14B, for example.

As illustrated in FIGS. 1, 6, and 7, the individual indicator light 52 of the individual illuminator indicator element comprises a first illuminated pictogram 54A and a second illuminated pictogram 54B.

The first illuminated pictogram 54A has an arrow shape, pointing to the first cockpit area 2A, for example. The second illuminated pictogram 54B has an arrow shape pointing to the second cockpit area 2B, for example.

Each illuminated pictogram 54A, 54B is configured to emit a green or red colored light signal, for example.

In particular, the first illuminated pictogram 54A of the first display panel 8A is configured to emit a green light signal. The second illuminated pictogram 54B of the first display panel 8A is configured to emit a red light signal.

In addition, the first illuminated pictogram 54A of the second display panel 8B is configured to emit a red light signal. The second illuminated pictogram 54B of the second display panel 8B is configured to emit a green light signal.

The individual haptic indicator elements are each respectively supported by a control stick 14A, 14B, for example.

The individual haptic indicator element comprises a vibrator, for example. A vibrator is supported by each of the control sticks 14A, 14B, for example. The signal is then a vibration emitted by the vibrator and perceptible by the pilot in control of the control stick 14A, 14B associated to said vibrator. The vibration indicates that the configuration of each control stick 14A, 14B has been changed, for example.

The vibrator is configured to vibrate when the associated control stick 14A, 14B changes from the piloting to the non-piloting configuration, for example. The vibration is momentary, for example, and lasts between 0.1s and 1s, for example. This vibration indicates to the pilot in control of the associated control stick 14A, 14B that the configuration of his/her stick 14A, 14B has been changed and is now non-piloting.

The controller 48 is connected to the selection module 16 and to the indicator elements 44, 46, and the individual haptic indicator elements. It is configured to receive selection data from the selection module 16. From selection data, the controller 48 is configured to deduce which control stick 14A, 14B is in a piloting configuration and which control stick 14A, 14B is in a non-piloting configuration. It is further configured to control the illuminated indicator elements 44, 46 and the individual haptic indicator elements, based on selection data.

When selection data indicates that the first control stick 14A is in a piloting configuration, the controller 48 controls the shared illuminated indicator element 44, so that it indicates that the first control stick 14A is in a piloting configuration and the second control stick 14B is in a non-piloting configuration. The first shared indicator light 50A then emits a light signal. Then, the second shared indicator light 50B does not emit a light signal.

When selection data indicates that the first control stick 14A is in a piloting configuration, the controller 48 further controls each individual illuminated indicator element 46, so that it indicates that the first control stick 14A is in a piloting configuration and the second control stick 14B is in a non-piloting configuration. The first illuminated pictogram 54A then emits a light signal. Then, the second illuminated pictogram 54B does not emit a light signal.

When selection data indicates that the second control stick 14B is in a piloting configuration, the controller 48 controls the shared illuminated indicator element 44 so that it indicates that the first control stick 14A is in a non-piloting configuration and the second control stick 14B is in a piloting configuration. The first shared indicator light 50A then does not emit a light signal. The second shared indicator light 50B then emits a light signal.

When selection data indicates that the second control stick 14B is in a piloting configuration, the controller 48 further controls each individual illuminated indicator elements 46, so that it indicates that the first control stick 14A is in a non-piloting configuration and the second control stick 14B is in a piloting configuration. The first illuminated pictogram 54A then does not emit a light signal. The second illuminated pictogram 54B then emits a light signal.

The controller 48 is further configured to control the first and second shared indicator lights 50A, 50B, such that when one shared indicator light 50A, 50B of the first and second shared indicator lights 50A, 50B emits a light signal, the other shared indicator light 50A, 50B of the first and second shared indicator lights 50A, 50B does not emit a light signal, and vice versa.

The controller 48 is further configured to control the first and second illuminated pictograms 54A, 54B such that when one illuminated pictogram 54A, 54B of the first and second illuminated pictograms 54A, 54B emits a light signal, the other illuminated pictogram 54A, 54B of the first and second illuminated pictograms 54A, 54B does not emit a light signal, and vice versa.

When selection data received by the controller 48 changes, i.e., when the configuration of the first and second control sticks 14A, 14B changes, the controller 48 controls the individual haptic indicator element of the control stick 14A, 14B, whose configuration changes from piloting to non-piloting, so that it emits a momentary vibration.

The following describes a piloting method for piloting an aircraft, using a piloting device 10, as described above. The method is described from the perspective of the first pilot. It is understood that the method is similar from the point of view of the second pilot.

Initially, the pilot operates the control system 24, to switch the first control stick 14A to its piloting configuration.

If the current configuration of the first control stick 14A is non-piloting, the first pilot selects the shared button 36, for example.

According to another example, regardless of the current configuration of the first control stick 14A, the first pilot selects the individual button 40 of the first control stick 14A. For example, the first pilot keeps the individual button 40 held down for a duration greater than the duration threshold.

The selection module 16 then configures the first control stick 14A to its piloting configuration and the second control stick 14B to its non-piloting configuration. The selection module 16 further generates selection data indicating that the first control stick 14A is in the piloting configuration.

As illustrated in FIG. 4, the first shared indicator light 50A then emits a light signal. The second shared indicator light 50B then does not emit a light signal.

As illustrated in FIG. 6, the first illuminated pictograms 54A of the individual indicator lights 52 then emit a light signal. The second illuminated pictograms 54B of the individual indicator lights 52 then do not emit a light signal.

When the control stick 14A is switched to the piloting configuration, the vibrator on the control stick 14B vibrates.

Thereafter, the first pilot moves the first control stick 14A through at least one degree of freedom, to control the aircraft. Position data relative to the first control stick 14A are then used to actuate the moving surfaces for controlling the aircraft.

The detection system 18 then generates first and second position data.

The control module 22 receives selection data from the selection module 16 and first and second position data from the detection system 18.

The control module 22 controls the actuation system 20A, 20B of the control stick 14A, 14B in a non-piloting configuration, based on the selection data. Thus, the control module 22 here controls the second actuation system 20B, to move the second control stick 14B, which is in the non-piloting configuration in this example, according to each degree of freedom, so that the position of the second control stick 14B in relation to its neutral position and the position of the first control stick 14A in relation to its neutral position are identical, according to each degree of freedom.

According to another embodiment, the selection module 16 does not keep the first control stick 14A in its piloting configuration when the individual button 40 of the first control stick 14A is held down, even beyond a duration longer than the duration threshold. In this embodiment, if the first control stick 14A is in its non-piloting configuration, the selection module 16 switches the first control stick 14A to its piloting configuration when the individual button 40 of the first control stick 14A is pressed by the first pilot and keeps the first control stick 14A in its piloting configuration as long as the individual button 40 of the first control stick 14A is held down. When said individual button 40 is released, the selection module 16 switches the first control stick 14A to its non-piloting configuration.

According to this embodiment, the selection module 16 does not keep the second control stick 14B in its piloting configuration when the individual button 40 of the second control stick 14B is held down even beyond a duration greater than the duration threshold. In this embodiment, if the second control stick 14B is in its non-piloting configuration, the selection module 16 switches the second control stick 14B to its piloting configuration when the individual button 40 of the second control stick 14B is pressed by the second pilot and keeps the second control stick 14B in its piloting configuration as long as the individual button 40 of the second control stick 14B is held down. When said individual button 40 is released, the selection module 16 switches the second control stick 14B to its non-piloting configuration.

According to this embodiment, if the first pilot wishes to be the "pilot flying" temporarily, during a certain period of time, for example, he/she keeps the individual button 40 of the first control stick 14A held down for a time equal to said period of time.

According to another embodiment, the selection module 16 is configured to switch and keep the first control stick 14A in its piloting configuration once the individual button 40 of the first control stick 14A is pressed by the first pilot.

According to this embodiment, if the first pilot wishes to be the "pilot flying" for an indefinite period of time, the first pilot presses the individual button 40 of the first control stick 14A without needing to keep said individual button 40 pressed.

According to another embodiment, the vibrator of each individual haptic indicator element is further configured to vibrate upon switching the associated control stick 14A, 14B from the non-piloting configuration to the piloting configuration, for example. This vibration indicates to the pilot in control of the associated control stick 14A, 14B that the configuration of his/her stick 14A, 14B has been changed. The pilot in control of the associated control stick 14A, 14B then knows that the configuration of his/her stick is now piloting if it was non-piloting previously, and that it is now non-piloting if it was piloting previously.

With the piloting device according to the present disclosure, the division of roles within the cockpit, between the "pilot flying" and the "pilot monitoring", is clear.

In addition, the aircraft situational awareness for each of the pilots is improved. Although the "pilot monitoring" cannot control the aircraft, he/she can easily analyze the commands made by the "pilot flying" through his/her own control stick.

What is claimed is:

1. A piloting device for piloting an aircraft comprising:
   a first control stick and a second control stick, each mounted on a support,
   each of the first and second control sticks being movable in relation to the support, between a plurality of positions around a neutral position in at least one degree of freedom,
   each of the first and second control sticks being configurable between a piloting configuration, in which said first or second control stick is configured for piloting the aircraft by sending a trajectory command to a control unit, and a non-piloting configuration, in which no trajectory command from said first or second control stick is taken into account by the control unit;
   a priority selection module configured to switch the first control stick between the piloting configuration and the non-piloting configuration, the selection module being configured to switch the second control stick to the non-piloting configuration when the first control stick is in the piloting configuration and to the piloting configuration when the first control stick is in the non-piloting configuration;
   a detection system for detecting the position of the first control stick and the position of the second control stick;
   a first actuation system configured to generate a first force on the first control stick according to the degree of freedom;
   a second actuation system configured to generate a second force on the second control stick according to the degree of freedom;
   a control module configured to control the actuation system of the first or second control stick which is in the non-piloting configuration, such that the position of said first or second control stick in the non-piloting configuration and the position of the first or second control stick which is in the piloting configuration are identical; and
   at least one control system for controlling the selection module, the control system being configured to be operated by a first or second pilot to control the selection module, so as to switch the first control stick between the piloting configuration and the non-piloting configuration;

the control system further comprising at least two individual control elements, each of the first and second control sticks comprising an individual control element, each individual control element being an individual button, the selection module being configured to switch the first control stick to its piloting configuration when the individual button of the first control stick is selected by the first pilot, the selection module being configured to switch the first control stick to its piloting configuration when the individual button of the first control stick is held down by the first pilot, the selection module being further configured to switch the first control stick to its non-piloting configuration when the individual button of the first control stick is released.

2. The piloting device according to claim 1, wherein the control system further comprises at least two individual control elements, each of the first and second control sticks comprising an individual control element.

3. The piloting device according to claim 2, wherein each individual control element is an individual button, the selection module being configured to switch the first control stick to its piloting configuration when the individual button of the first control stick is selected by the first pilot.

4. The piloting device according to claim 3, wherein, when the individual button of the first control stick is held down by the first pilot for a duration greater than a duration threshold, the selection module is configured to keep the first control stick in its piloting configuration.

5. The piloting device according to claim 1, further comprising a priority indication system configured to output a signal representative of the configuration of at least one control stick among the first control stick and the second control stick.

6. The piloting device according to claim 5, wherein the priority indication system comprises at least one indicator light, the signal being a light signal visible to at least one of the first or second pilot, indicating the current configuration of at least one of the first control stick and the second control stick.

7. The piloting device according to claim 5, wherein the priority indication system further comprises a vibrator, the signal being a vibration perceptible by at least one of the first or second pilot and indicating that the configuration of each of the first and second control sticks has been changed.

8. A piloting method for piloting an aircraft using the piloting device according to claim 1, the method comprising:
configuring the first control stick in the piloting configuration and the second control stick in the non-piloting configuration, by the selection module;
moving the first control stick according to the degree of freedom, by the first pilot;
controlling of the second actuation system by the control module, to generate a second force on the second control stick according to the degree of freedom so that the position of the second control stick and the position of the first control stick are identical;
switching, by the selection module, the first control stick to its piloting configuration when the individual button of the first control stick is held down by the first pilot; and switching, by the selection module, the first control stick to its non-piloting configuration when the individual button of the first control stick is released.

9. The piloting method according to claim 8, the method comprising an actuation of the control system to switch the first control stick to the piloting configuration and the second control stick to the non-piloting configuration, said actuation of the control system being carried out by the first or second pilot.

10. The piloting method according to claim 9, wherein the control system comprises a shared control element, the shared control element being a shared button, the selection module switching the first control stick from either its piloting or its non-piloting configuration to the other when the shared button is selected by the first or second pilot.

11. The piloting method according to claim 9, wherein the control system comprises at least two individual control elements, each of the first and second control sticks comprising one of the at least two individual control elements, each of the at least two individual control elements being an individual button, the selection module switching the first control stick to its piloting configuration when the individual button of the first control stick is held down by the first pilot, the selection module switching the first control stick to its non-piloting configuration when the individual button of the first control stick is released.

12. The piloting method according to claim 9, wherein the control system comprises at least two individual control elements, each of the first and second control sticks comprising one of the at least two individual control elements, each of the at least two individual control elements being an individual button, the selection module switching the first control stick into the piloting configuration when the individual button of the first control stick is selected by the first pilot, the first control stick being kept in the piloting configuration when the first control stick is held down by the pilot for a duration greater than the duration threshold.

13. The piloting device according to claim 1, further comprising at least one control system for controlling the selection module, the control system being configured to be operated by the first or second pilot to control the selection module, so as to switch the first control stick between the piloting configuration and the non-piloting configuration.

14. The piloting device according to claim 13, wherein the control system comprises a shared control element, located on a control panel of a cockpit of the aircraft.

15. The piloting device according to claim 14, wherein the shared control element is a shared button, the selection module being configured to change the configuration of the first control stick from one of the piloting or non-piloting configuration to the other of the piloting or non-piloting configuration when the shared button is selected by the first pilot.

16. A cockpit comprising:
the piloting device according to claim 14;
a first cockpit area intended to accommodate the first pilot;
a second cockpit area intended to accommodate the second aircraft pilot;
a control panel; and
the shared control element being arranged between the first and second cockpit areas so that the shared control element is actionable by the first and second pilots.

* * * * *